(12) United States Patent
Han et al.

(10) Patent No.: US 8,049,839 B2
(45) Date of Patent: Nov. 1, 2011

(54) BACKLIGHT ASSEMBLY USING FLEXIBLE LIGHT GUIDING FILM AND LIQUID CRYSTAL DISPLAY MODULE USING THE SAME

(75) Inventors: Byung-Woong Han, Incheon (KR); Kyu-Seok Kim, Yongin-si (KR); Jeong-Min Seo, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 256 days.

(21) Appl. No.: 12/494,796

(22) Filed: Jun. 30, 2009

(65) Prior Publication Data

US 2010/0123858 A1    May 20, 2010

(30) Foreign Application Priority Data

Nov. 17, 2008  (KR) .................. 10-2008-0114097

(51) Int. Cl.
*G02F 1/1335* (2006.01)

(52) U.S. Cl. ........................................... 349/65

(58) Field of Classification Search ............ 349/65
See application file for complete search history.

(56) References Cited

U.S. PATENT DOCUMENTS 7,102,705 B2 * 9/2006 Kim et al. ............ 349/65

FOREIGN PATENT DOCUMENTS

| | | |
|---|---|---|
| JP | 2000-249837 A | 9/2000 |
| JP | 2004-069751 A | 3/2004 |
| KR | 1020040070843 A | 8/2004 |
| KR | 1020080050791 A | 6/2008 |
| KR | 1020080060736 A | 7/2008 |

* cited by examiner

*Primary Examiner* — James Dudek
(74) *Attorney, Agent, or Firm* — Cantor Colburn LLP

(57) ABSTRACT

A flexible light guiding film includes a base film having a substantially constant thickness, and a light controlling portion disposed on the base film. Edges of the light controlling portion and the base film are coplanar and define a light incident surface of the light guiding film. The light incident surface is thicker than the base film, but has a similar thickness with that of a light exiting surface of a light source.

22 Claims, 7 Drawing Sheets unit: mm

| Case | LS | H | T | A | L |
|------|------|------|------|-----|-----|
| 1 | 0.60 | 0.60 | 0.55 | 0.4 | 0.7 |
| 2 | 0.60 | 0.60 | 0.50 | 0.4 | 0.9 |
| 3 | 0.60 | 0.60 | 0.45 | 0.5 | 1.0 |
| 4 | 0.60 | 0.60 | 0.40 | 0.6 | 1.6 |
| 5 | 0.60 | 0.55 | 0.50 | 0.3 | 0.7 |
| 6 | 0.60 | 0.55 | 0.45 | 0.4 | 0.8 |
| 7 | 0.60 | 0.50 | 0.40 | 0.4 | 0.9 |
| 8 | 0.60 | 0.40 | 0.35 | 0.4 | 0.6 |
| 9 | 0.40 | 0.40 | 0.30 | 0.4 | 1.2 |
| 10 | 0.40 | 0.40 | 0.25 | 0.5 | 1.6 |
| 11 | 0.40 | 0.35 | 0.30 | 0.4 | 0.5 |
| 12 | 0.40 | 0.35 | 0.25 | 0.3 | 1.3 |

FIG. 5

| Material for Base Film | Material for Optical Patch | Primer Treatment | Adhesive Strength |
|---|---|---|---|
| PMMA (Poly Methyl Methacryalte) | Urethane Acrylate | Non-treated | Weak |
| PMMA (Poly Methyl Methacryalte) | Urethane Acrylate | Treated | Strong |
| PC (Polycarbonate) | Urethane Acrylate | Non-treated | Strong |
| PC (Polycarbonate) | Urethane Acrylate | Treated | Strong |
| PS (Polystyrene) | Urethane Acrylate | Non-treated | Medium |
| PS (Polystyrene) | Urethane Acrylate | Treated | Strong |

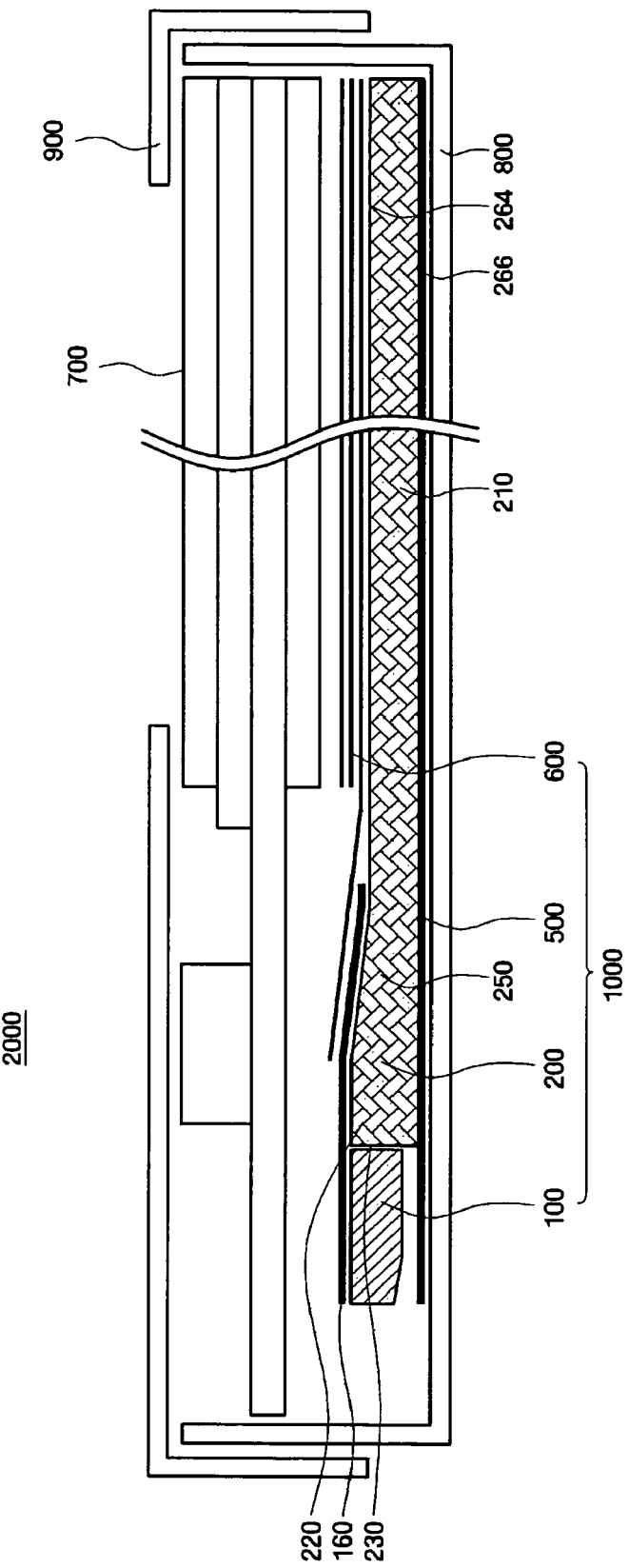

BACKLIGHT ASSEMBLY USING FLEXIBLE LIGHT GUIDING FILM AND LIQUID CRYSTAL DISPLAY MODULE USING THE SAME

This application claims priority to Korean Patent Application No. 10-2008-0114097, filed on Nov. 17, 2008 and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") backlight assembly, and more particularly, the present invention relates to a backlight assembly using an enlarged light incident surface of a light guiding film ("LGF") for enhanced optical efficiency of the backlight assembly.

2. Description of the Related Art

As display devices are used in everyday life, the liquid crystal display ("LCD") has been gaining popularity. The LCD contains an LCD module which is combined with outer cases of the LCD. The LCD module has a thin film transistor ("TFT") panel which includes a pair of opposing substrates with a liquid crystal layer therebetween.

Since the liquid crystal layer is not self-emissive, the LCD module also has a backlight assembly, which is located behind the TFT panel, to provide light to the liquid crystal layer. Due to light from the backlight assembly, transmittance of the TFT panel is controlled by arranging the liquid crystal molecules for each pixel.

The backlight assembly is classified into two groups according to the location of a light source, a direct light backlight assembly and an edge light backlight assembly. In the edge light backlight assembly, the light source is located at a lateral side of a light guiding plate ("LGP") which is placed between a TFT panel and the light source. As a light source, a linear fluorescent lamp has been used, however, point light sources such as a light emitting diode ("LED") may also be used, such as to achieve a relatively thin and compact LCD module.

Specifically, the LED, which may also be referred to as a semiconductor package, may be thinner than the fluorescent lamp, such as a glass pipe, to make the LCD module thin, light and compact. In consideration of compactness of the LCD module, other components of the LCD module, such as the TFT panel and the LGP, are also made thinner and smaller. Especially, a thickness of the LGP may be controlled such as to lessen a rigidity thereof and, in turn, impart flexibility, such that the LGP may be referred to as a light guiding film ("LGF") including flexibility.

BRIEF SUMMARY OF THE INVENTION

When a display device includes a plurality of a light emitting diode ("LED"), and a light guiding film ("LGF"), there may be technical challenges in manufacturing and assembly the display device to achieve a relative thin and compact design. For example, even though the LEDs may be compact, the LEDs may not be as thin as the LGF, since the LEDs may include a package of an inner light emitting semiconductor chip and an outer frame encompassing the chip. Therefore, in a structural aspect, there would be a thickness difference between a closely located light incident surface of the LGF and the LEDs in an edge light backlight assembly. Consequently, the thickness difference would result in lower luminance of the backlight assembly since not all the light emitted from the LEDs would be introduced to the LGF.

Furthermore, with a less thick light incident surface of the LGF, since the LEDs are spaced apart from each other along the light incident surface, there would be undesirable hot spots, which cause luminance non-uniformity of the backlight assembly.

An exemplary embodiment provides a backlight assembly with a high luminance and uniformity, while a relatively thin light guiding film is employed to the backlight assembly.

An exemplary embodiment of a LCD module includes a TFT panel, a backlight assembly and a frame unit. The TFT panel includes a pair of transparent substrates, a liquid crystal layer disposed in between the substrates and a pair of polarizers disposed on outer surfaces of each substrate to selectively pass light in response to the electric charge of each pixel of the LCD module.

The backlight assembly includes a plurality of light emitting diodes ("LEDs") and a light guiding film ("LGF") disposed adjacent to the LEDs. The backlight assembly may also include at least one optical sheet disposed on the LGF and providing uniform luminance to the TFT panel. The frame unit includes an upper frame and a lower frame enclosing the TFT panel and the backlight assembly to make the LCD module into a single unit.

In the backlight assembly, the thickness of the LED is similar to or less than the thickness of a light incident surface of a light introducing part of the LGF, to accommodate light emitted from the LED effectively. The LGF also includes a light propagating part extended from the light introducing part. The light propagating part outputs light to the TFT panel by receiving and propagating light of the light introducing part. Since the LGF is designed to make the backlight assembly thin and compact, the light propagating part is thinner than both of the LED and light incident surface.

The LGF is a combination of the base film and a light controlling portion attached to the base film. The base film is a relatively thin and flexible plastic film, and including an inner area serving as a passage for light emitted from the LEDs. The base film also includes a light outputting surface providing light to the TFT panel.

The light controlling portion is disposed on the base film and forms the light incident surface along with a surface of the base film at the light introducing part of the LGF. Being combined with the base film, the light controlling portion receives the light emitted from the LEDs together with the base film, to enhance the optical efficiency by making the incident surface thicker than the base film, in a direction substantially perpendicular to a surface of the base film upon which the light controlling portion is disposed.

In an exemplary embodiment of the invention, the light controlling portion includes a slope inclined from the light incident surface to a light outputting surface of the base film.

In an exemplary embodiment of the invention, the light controlling portion includes a flat surface parallel to the light propagating part of the base film, and from which the slope extends to the light outputting surface of the base film.

In an exemplary embodiment of the invention, the light controlling portion is disposed on either an upper surface or a lower surface of the base film at the light controlling part. Alternatively, the light controlling portion may be disposed at both the upper and the lower surfaces of the base film, so long as light emitted from the LEDs is effectively incident to the LGF.

In an exemplary embodiment of the invention, a plurality of minute patterns are disposed continuously on the same surface of the base film as the light controlling portion. The minute patterns may be disposed on only an upper surface, only a lower surface or both the upper and the lower surfaces of the base film. Here, the upper surface may also be the light outputting surface of the LGF, and the lower surface may also be a light reflecting surface of the LGF facing the light outputting surface.

In an exemplary embodiment of a method of manufacturing the invention, the base film is made of a plastic material such as polycarbonate ("PC") and is flexible to be rolled around a reel. Alternatively, the light controlling portion is made of a UV curable material and is disposed onto the base film to be cured by ultraviolet ("UV") rays.

BRIEF DESCRIPTION OF THE DRAWINGS

The above and/or other aspects and advantages of the invention will become apparent and more readily appreciated from the following description of the exemplary embodiments, taken in conjunction with the accompanying drawings of which:

FIG. 5 is a table of experiment data showing exemplary embodiments of adhesive strength between various materials of the base film and the material of an optical member, according to the present invention;

FIG. 7 is a cross-sectional view of an exemplary embodiment of a liquid crystal display ("LCD") module which adopts an LGF having an optical member on a base film, according to the present invention.

DETAILED DESCRIPTION OF THE INVENTION

Figure 1:
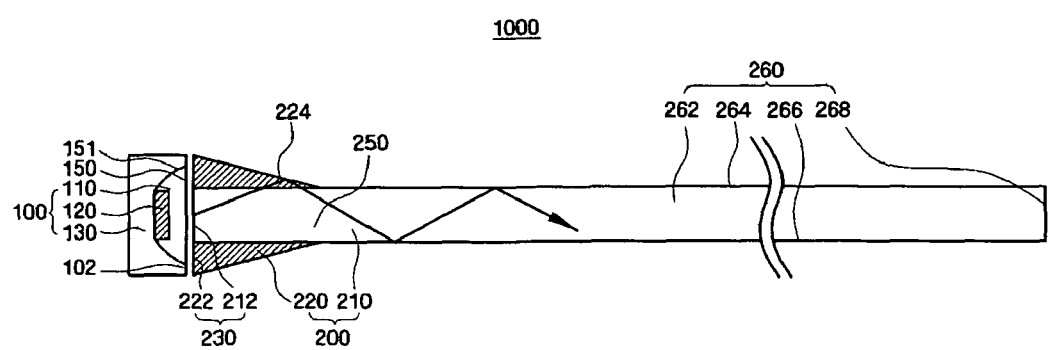
FIG. 1 is a cross-sectional view of an exemplary embodiment of a backlight assembly illustrating mutually facing light emitting diode ("LED") and light guiding film ("LGF"), according to the present invention.

Reference will now be made in detail to exemplary embodiments of the present invention, examples of which are illustrated in the accompanying drawings, wherein like reference numerals refer to like elements throughout. The embodiments are described below in order to explain the present invention by referring to the figures. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

FIG. 1 is a cross-sectional view of an exemplary embodiment of a backlight assembly illustrating a mutually facing light emitting diode ("LED") and a light guiding film ("LGF"). According to FIG. 1, the backlight assembly 1000 includes a light source 100 and a LGF 200. The light source 100 may also be hereinafter referred to as a LED package or an LED. In exemplary embodiments, the backlight assembly 1000 may also include at least one optical member such as a diffuser, prism sheet, etc.

The light source 100 may include any various types of light sources, such as a LED, Cold Cathode Fluorescent Lamp ("CCFL") and planar Organic Light Emitting Diode ("OLED"). The light source 100 may include a plurality of an individual light source, such as a point light source LED, such that the plurality of the individual light source collectively forms the light source 100.

In an exemplary embodiment, where the light source 100 including the plurality of the individual light sources is an LED package or an LED, the LED 100 may include any of a white LED, a red LED, a blue LED, a green LED, or a combination thereof, which emits colored light corresponding to the individual light sources designation (e.g., white, red, blue, green). Since the backlight assembly emits white light, only the white LED may be employed, while a combination of red, green, and blue LEDs is also eligible for white light. Since the LED 100 is a point light source, a series of LEDs may be arranged in front of the LGF 200, while each of the LEDs 100 is spaced apart from neighboring LEDs. The front of the LGF 200 may refer to an incident side or face of the LGF.

In view of structure and parts, each LED 100 may include a light emitting chip 120 for providing light, a protection member 110 encompassing and protecting the light emitting chip 120, and a shell 130 accommodating the light emitting chip 120 and the protection member 110. The shell 130 may include an area of material, or be void of material (e.g., empty space).

Specifically, the protection member 110 may also be referred to as a resin space 110, which may include an area of material, or be void of material (e.g., empty space). The resin space 110 defines a light emitting window 150 including an edge 151 disposed within a light exiting surface 102 of the LED 100. The light emitting window 150 is a portion of the light exiting surface 102. The edge 151 of the light emitting window 150 is defined by a boundary between the resin space 110 and the shell 130 of the LED 100, as indicated by the dotted line portion in FIG. 1.

The LED 100 may include the light exiting surface 102, a base surface disposed opposite to the light exiting surface 102 with respect to the light emitting chip 120 and facing the light exiting surface 102, and a plurality of side surfaces disposed adjacent to both the base surface and the light exiting surface 102, while connecting the base surface and the light exiting surface 102 to each other. In an exemplary embodiment, the LED 100 may include four side surfaces connected to the base surface and the light exiting surface 102, such that the side surfaces, the base surface and the light exiting surface 102 completely enclose and surround the light emitting chip 120.

The light exiting surface 102 is a portion of LED 100 facing a light incident surface 230 of the LGF 200. In addition, the light exiting surface 102 is wider than the light emitting window 150 of the resin space 110, while both the light exiting surface 102 and the light emitting window 150 lie on substantially the same plane. The light exiting surface 102 is wider than the light emitting window 150 of the resin space 110 in a first (e.g., vertical) direction substantially parallel to the light incident surface 230 of the LGF 200, as the light exiting surface 102 extends further than the light emitting window 150, as shown in FIG. 1.

In view of structure and parts, the LGF 200 has a base film 210 facing the light exiting surface 102 of the LED 100. The base film 210 may be a substantially planar member. The LGF 200 includes a first edge 212 and a light controlling portion 220 attached around the first edge 212 of the base film 210. The first edge of 212 the base film 210 is aligned (e.g., linearly and/or coplanarly) with a light controlling portion edge 222 of the light controlling portion 220, thereby to form a single, continuous and indivisible light incident surface 230.

The light emitted from the LED 100 is introduced to the light incident surface 230, which is a portion of a light introducing part 250. Specifically, the light introducing part 250 is a combined structure of light controlling portion 220 and a part of the base film 210 below the light controlling portion 220. As used herein, "below" indicates further than the light controlling portion 220 in a light emitting or traveling direction, such as indicated by the arrow within the LGF 200, extended towards the right in FIG. 1. The light controlling portion 220 has a slope 224 declining to the base film 210 from the light incident surface 230. In the illustrated embodiment, the slope 224 is extended substantially linearly and constant from the light incident surface 230 to an upper surface of the base film 210, but the present invention is not limited thereto. The slope 224 may be curved or stepped, such as to achieve differing thicknesses of the light controlling portion 220 at the light incident surface 230 and the upper surface of the base film 210.

A thickness of the light controlling portion 220, taken in the first direction, is smaller at a distal end furthest from the light incident surface 230, than at the light incident surface 230. A length of the light controlling portion 220 from the light incident surface 230 to the distal end, taken in a second direction substantially perpendicular to the first direction, may be set at a predetermined distance along the base film 210. The length may also be referenced by the light emitting or traveling direction along the LGF 200.

Emitted light from the LED 100 enters the base film 210 and the light controlling portion 220, to be incident on the light guiding film 200. The slope 224 redirects light from the light controlling portion 220 to the base film 210, such that the incident light travels to a light propagating part 260 of the LGF 200.

The light introducing portion 250 and the light propagating portion 260 collectively form a single, continuous and indivisible base film 210 of the LGF 200. The light introducing portion 250 may include the light controlling portion 220. The light propagating portion 260 includes an inside portion 262, an upper surface 264, a lower surface 266 and a second edge 268. The second edge 268 is disposed opposite to the first edge 212 with respect to the light introducing portion 150 and the light propagating portion 260, and faces the first edge 212. The lower surface 266 and the upper surface 264 are disposed substantially parallel to each other, and connect the first edge 212 and the second edge 268 to each other. The LGF 200 may also include side surfaces disposed adjacent and connected to each of the lower surface 266, the upper surface 268, the first edge 212 and the second edge 268.

In terms of light distribution, after the light passes through the light introducing part 250, the light travels within the inside portion 262 of the LGF 200, while the light is also reflected and/or passes through the surfaces 264, 266, 268, to be substantially evenly distributed throughout the whole light propagating part 260.

In terms of the dimensions of each part of the LGF 200, the light introducing part 250 is thicker than the light propagating part 260 since light controlling portion 220 is attached to the base film 210. The thickness is taken in the first direction and substantially perpendicular to the upper surface 264 and/or the lower surface 266 of the light propagating portion 260.

Figure 2:
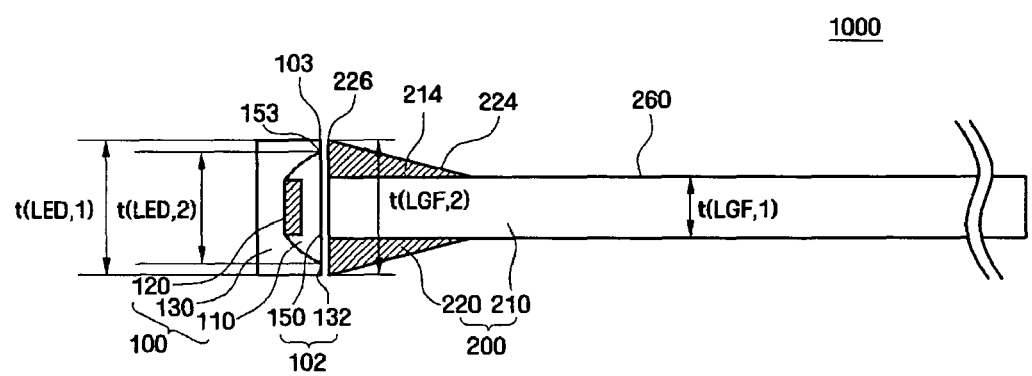
FIG. 2 is a cross-sectional view of the backlight assembly illustrating an exemplary embodiment of a thickness relationship between LED and LGF of FIG. 1, according to the present invention.

FIG. 2 is a cross-sectional view of the backlight assembly illustrating a thickness relationship between the LED and LGF of FIG. 1. The LED 100 and LGF 200 of FIG. 2 include the same parts and portions with FIG. 1 except the thickness expression. The thickness of the features described, is taken in the first direction as illustrated by the vertical double-headed arrows in FIG. 2.

According to FIG. 2, the LED 100 includes the light exiting surface 102 including the light emitting window 150 of the resin space 110, and a rim 132 of the shell 130. The rim 132 is disposed coplanar with the light emitting window 150 surface. In the illustrated embodiment, the light emitting window 150 is positioned substantially in the middle of the light exiting surface 102, to be a light passage where light directly passes from the light emitting chip 120 to the light incident surface 230 of the LGF 200. The light emitted from the LED 100 through the light emitting window 150 is directly incident on the light incident surface 230 of the LGF 200.

In an exemplary embodiment, the rim 132 surrounds the light emitting window 150, and may reflect light which is not incident to the light incident surface 230 of the LGF 200. The reflected light from the rim 132 may be directed back towards the light incident surface 230 of the LGF 200. The rim 132 is disposed between edge 151 and each of side surfaces of the LED 100, such as to "surround" the light emitting window 150.

To maximize the light emitted from the light emitting chip 120, the light emitting window 150 has a relatively wide area, with a thickness of t(LED, 2) in cross-sectional view of FIG. 2. The light emitting window thickness t(LED, 2) does not extend over a whole of the light exiting surface 102, since the light emitting window 150 is surrounded by the rim 132. Since the rim 132 faces a portion of the light incident surface of the LGF 200, the rim 132 optically communicates with the light incident surface 230 of the LGF 200, to accommodate more light to the light incident surface 230. Therefore, the light exiting surface thickness t(LED, 1) is the sum of the thickness of the light emitting window 150 and a thickness of the rim 132. The light exiting surface 102 of the LED 100 may overlap an entire of the light incident surface 230 of the LGF 200, such that ends of the light exiting surface 102 and the light incident surface 230 substantially coincide with each other, or are considered coplanar.

Regarding another dimensional aspect of the backlight assembly, as shown in FIG. 2, the base film 210 is extended from the light incident surface 230 with a substantially constant thickness, while the light controlling portion 220 is attached onto the base film 210 at the light introducing part 250, to make the light introducing part 250 thicker than the light propagating part 260 of the LGF 200. That is, the thickness of the base film 210 is maintained, regardless of the location of the LGF 200.

In exemplary embodiments the thickness of the base film 210 of the LGF 200 may be about 100 um (micrometers) to about 400 um (micrometers). The base film 210 may be manufactured by an extrusion method, rather than an injection molding method. Unlike the injection molding method for manufacturing rigid light guiding plate ("LGP"), the extrusion method for the LGF 200 produces a substantially uniform thickness film, which may range from about 100 um to about 400 um.

In an exemplary embodiment with the extrusion method, a typical (e.g., average) thickness of the base film 210 may be about 250 um, while a minimum thickness for making an LGF having flexibility and dimensions (other than the thickness) of about 2.2 inches and for a 10 inch LCD module, may be about 100 um. In contrast, with the injection molding method for the LGP, the thickness of the rigid LGP may range from about 250 um to about 800 um, such as being typically about 600 um, while the minimum thicknesses for making the flexible LGP having dimensions of 2.2 inches and a 10 inch LCD module, may be about 250 um and about 600 um, respectively. Advantageously, a thickness of the LGF is reduced, thereby resulting in a thin and compact LCD device.

As discussed above, the LGF 200 with a certain thickness may be used in differently sized LCDs, such as those having dimensions of about 2.2 inches and 10 inches, whereas the thickness of the LGP is various according to the size of the LCDs. Advantageously, the LGF may be employed in an LCD device without regard to the size of the LCD device. In addition, since both of the minimum and typical thicknesses of the LGF is much less than the thicknesses of the LGP, the LGF is superior in making a thin and compact backlight assembly and LCD.

Within the backlight assembly of the illustrated embodiment, even though the thickness of the base film 210 is reduced, the overall thickness of the light source, LED 100, may not reduced as much as the LGF. To reduce a thickness of the light source, an additional optical media disposed at the light introducing part 250 may be necessary. In accordance with the illustrated embodiments, the light controlling portion 220 attached to the light introducing part 250 is the additional optical media.

In detail, according to FIG. 2, along with the base film 210 of the light introducing part 250, the light controlling portion 220 forms the light incident surface 230 along with the base film 210. A thickness t(LGF, 2) of the light controlling portion 220 is substantially the same as the thickness t(LED, 1) of a whole of the light exiting surface 102 of the LED 100. Since the thickness of the light controlling portion 220 declines as the light controlling portion 220 approaches the light propagating part 260, the thickness of the LGF 200 continuously decreases within the light introducing part 250. Eventually, the thickness of the LGF 200 remains constant since the base film thickness t(LGF, 1) is constant, such as at a point past the distal end of the light controlling portion 220.

More specifically, according to FIG. 2, the light emitting window 150 overlaps an entire of the first (incident) edge 212 of the base film 210, since the thickness t(LED, 2) of the light emitting window 150 is greater than a thickness of the first edge 212. The edge 151 of the light emitting window 150 overlaps a portion of the light controlling portion 220. A thickness of the light emitting window 150 is larger than the first edge 212 of the base film 210 at the light introducing part 250, to provide more light from the light emitting chip 120 to the base film 210. Here, the light emitting window 150 is wider and exceeds the upper edge 214 of the base film 210 and a lower edge of the base film 210, in the first direction. Advantageously, the light controlling portion 220 may accommodate more light, and induce the light back to the base film 210 with the declined slope 224. Another aspect found in a wider light emitting window 150 than the base film 210, is that the light emitted from the light emitting chip 120 is directly incident to the base film, such as to be delivered to the whole base film and eventually emitted to a TFT panel of a display device.

An uppermost part 226 of the light controlling portion 220, may be disposed higher (e.g., further) than an uppermost edge 153 of the light emitting window 150, to fully accommodate the light of the light emitting window 150. As used herein, "upper" indicates in the vertical direction of FIG. 2. Further, the rim 132 of the shell 130 of the LED 100, facing the upper part 226 of the light controlling portion 220, may also function as an extra light emitting media when light failing to be directly incident to the LGF 200 is redirected to the rim 132 which reflects the light to the light incident surface 230. Advantageously, by the rim 132 redirecting and recycling the light to the LGF 200, the optical efficiency of the LCD device is improved.

Based on the relationship between the optical aspect (of light efficiency) and the structural aspect (of the thickness and compactness), the higher the uppermost (edge) part 226 of the light controlling portion 220 is, the more optical efficient the backlight assembly 1000 may become. However, the location of the uppermost part 226 of the light controlling portion 220 may remain within a certain range and be limited, because the higher the uppermost part 226 of the light controlling portion 220 is, the thicker the backlight assembly 1000 and LCD module become overall.

In an alternative embodiment, to achieve a overall thinner backlight assembly and LCD module, the uppermost (edge) part 226 of the light introducing part 250, may be disposed lower than an uppermost part 103 of the light exiting surface 102 in the vertical direction of FIG. 2. An entire of the light incident surface 230 of the LGF 200 may overlap only a portion of the light exiting surface 102 of the LED 100, so long as there would be sufficient luminance on the light outputting upper surface 264 of the light propagating part 260. Even though the uppermost part 226 of the light introducing part 250 would be lower than the uppermost part 103 of the light exiting surface 102, the uppermost part 226 of the light introducing part 250 may be higher than the uppermost edge 153 of the light emitting window 153, since most of the light of the light exiting surface 102 is emitted from the light emitting window 150, rather than the rim 132 of the shell 130. Here, the uppermost edge 226 would be disposed between the uppermost edges 103 and 153. In sum, the thickness of a whole of the light exiting surface 102 of the LED 100, may be substantially about the same with, a little higher or a little bit lower than a whole of the thickness of the light incident surface 230 of the LGF 200.

Figures 3A, 3B:
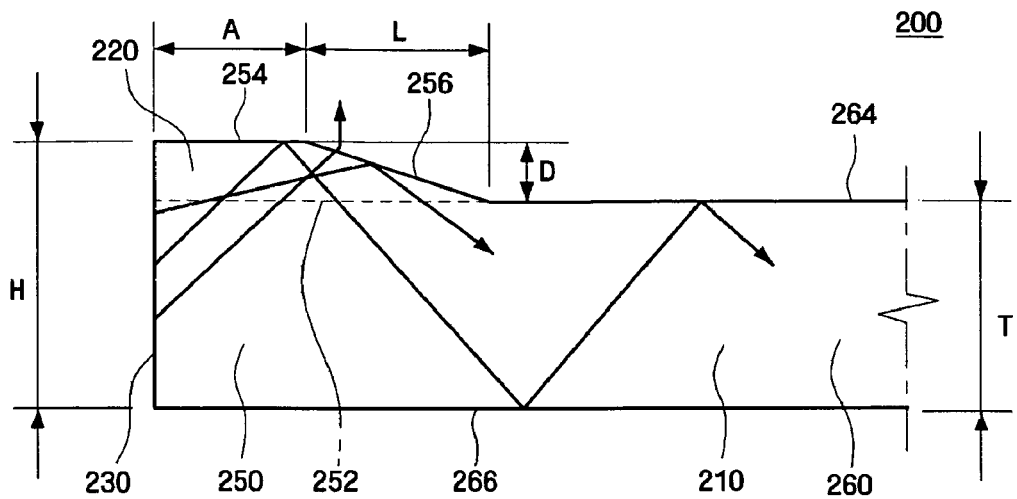
FIG. 3A is a cross-sectional view of an exemplary embodiment of a LGF having a flat portion at a light introducing part, according to the present invention.
FIG. 3B is a table illustrating exemplary embodiments of combination of dimensions of a light incident surface thickness, a flat portion length, a slope length and a base film thickness of the light introducing part of a LGF, according to present invention.
Figure 3C:
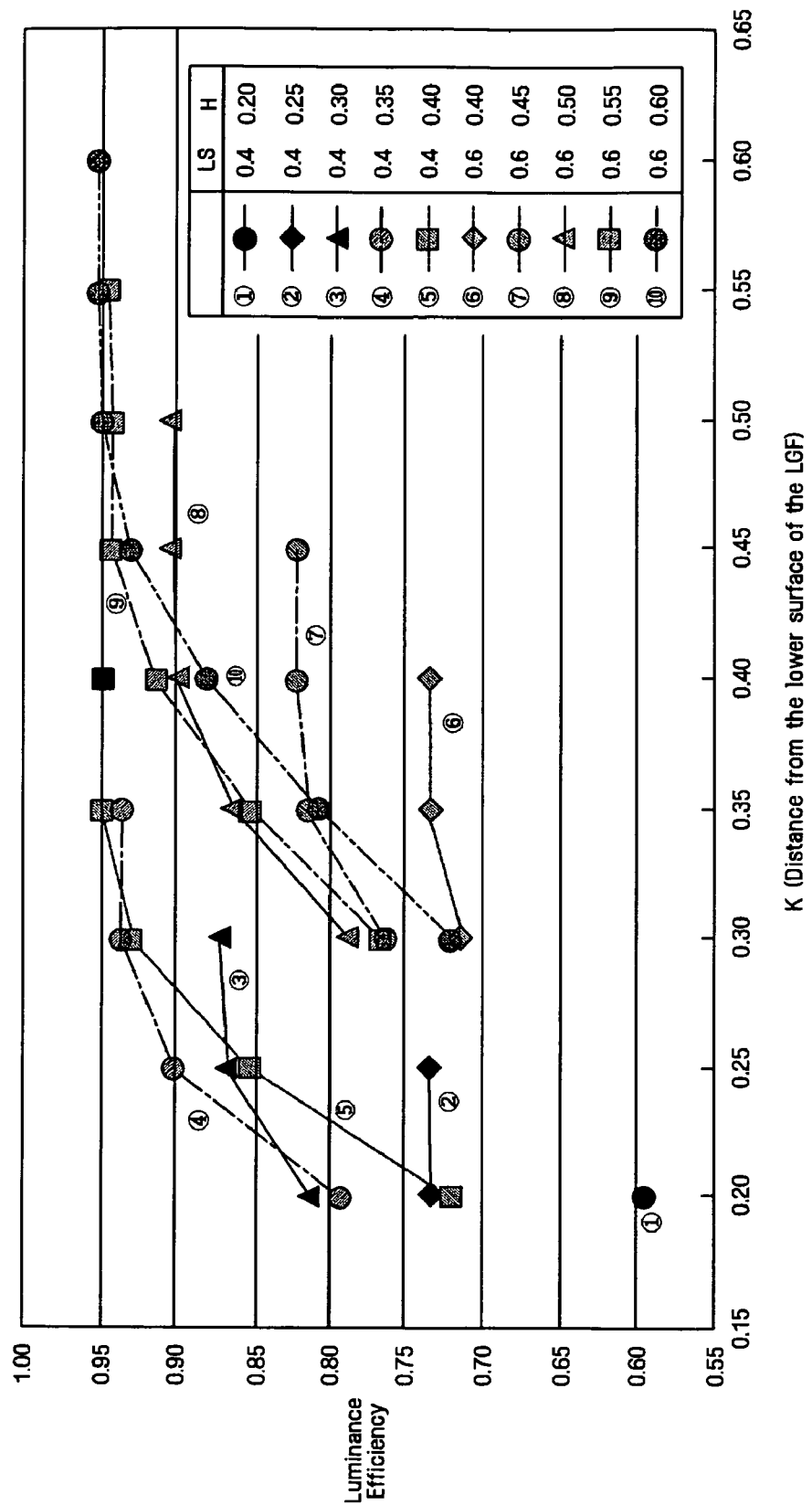
FIG. 3C is a luminance efficiency graph illustrating exemplary embodiments of a relationship between the thicknesses of the light propagating part and the light introducing part of the LGF, according to the present invention.

FIG. 3A is a cross-sectional view of an exemplary embodiment of a LGF including a flat portion at a light introducing part. FIG. 3B is a table illustrating exemplary embodiments of combination of dimensions showing varying light incident thickness, flat portion length, slope length and base film thickness of a light introducing part of a LGE FIG. 3C is a luminance efficiency graph revealing exemplary embodiments of relationships between the thickness of the light exiting surface and the light introducing part of a LGF.

According to FIG. 3A, the LGF is expressed as one single, continuous and indivisible unit as including main components, base film 210 and the light controlling portion 220, seamlessly without interfaces and firmly combined to act as one single, continuous and indivisible optical media. Like FIGS. 1 and 2, the light introducing part 250 has a single, continuous and coplanar (vertical) incident surface, rather than a plurality of or non-coplanar surfaces, formed by each of the base film first edge 212 and the light controlling portion edge 222, of a light incident surface 230 to enhance the light receiving efficiency. With the more mismatched (e.g., non-coplanar) surfaces and interfaces, there is an increased disadvantage of light loss since each of the interfaces would redirect the light to the LED (not shown). Consequently, the single, continuous and indivisible unified surface of the light incident surface 230 is advantageous for receiving light of the LED (not shown).

A virtual interface 252 between the base film 210 and the light controlling portion 220 is indicated by the horizontal dotted line in FIG. 3A. To minimize the light loss at interface 252 of the light introducing part 250 and accommodate more light to the light introducing part 250 of the LGF 200, the materials of both the base film 210 and the light controlling portion 220 have similar refractive indexes. In one exemplary embodiment, the refractive indexes of the base film 210 may be about 1.5 such as by using Poly Methyl Methacrylate ("PMMA") whose refractive index ranges from approximately 1.49 to 1.54. Alternatively, a similar refractive index may be Polycarbonate ("PC") which has refractive index ranges from approximately 1.54 to 1.59, and Polystyrene ("PS") which has refractive index ranges from approximately 1.49 to 1.59.

In an exemplary embodiment, the material of the light controlling portion 220 may include polymerized Urethane Acrylate having a refractive index range from about 1.43 to 1.60, which would be compatible with the base film material introduced above. Since the refractive indexes of the base film 210 and the light controlling portion 220 are substantially the same, light refracting and redirecting at the interface 252 is advantageously suppressed to enhance the luminance efficiency of the LGF 200.

In FIG. 3A, unlike FIGS. 1 and 2, the light introducing part 250 includes a flat portion 254 extended from an edge of the light incident face 230 at a first end of the flat portion 254, and a slope 256 extended inclined from a second end of the flat portion 254 toward an upper surface of the base film 210. The main difference between the flat portion 254 and the slope 256 is whether a total thickness of the LGF 200 at each point is maintained or not. If the total thickness of the LGF 200 is maintained within the light introducing part 250, the area of the light introducing part 250 is considered the flat portion 254, whereas an area of the light introducing part is considered as the slope 256 if the total thickness of the LGF 200 is not maintained, for example, is decreasing. The light introducing part 250 is effectively defined as an area of the LGF 200 extending from the light incident face 230 to a distal end of the slope 256, in the second direction along the LGF 200.

The flat portion 254 is further distinguishable from the slope 256 in that the flat portion 254 is extended substantially in parallel with the base film 210 from the light incident surface 230, while the slope 256 is not disposed substantially in parallel (e.g., inclined or curved) from the light introducing part 250 to the light propagating part 260 to finally meet the base film 210. In the illustrated embodiment, the flat portion 254 is extended from the light incident face 230 and does not contact the base film 210. However, the flat portion 254 may not only define a straight lined shape parallel to the base film, but may also define any of a number of various shapes so long as the shapes does not meet the base film 210. In contrast, the slope 256 is different from the flat portion 254 in that the slope 256 does contact or meet the base film 210 at a portion of the slop 256.

The flat portion 254 functions to accommodate the exited light from the LED (not shown) more efficiently, by minimizing the redirected light reflected by the slope 256 or passed light passing through the slope 256 without entering into the light propagating part 260 of the LGF 200. Namely, the exited light from the LED may be more easily and effectively introduced with the flat portion 254 of the light introducing part 250 to the light propagating part 260. Advantageously, the optical efficiency of the LGF 200 may be controlled by optimizing a length along the second direction of the flat portion 254 and of the slope 256.

Referring to FIG. 3A, the light introducing part 250 has a thickness of the light incident surface 230 taken from the lower (reflective) surface 266, a length of the flat portion 254, a length of the slope 256, a height of the slope 256 and a thickness of the base film 210, designated as H, A, L, D, and T, respectively. FIG. 3B is a table of various combination of dimension of the light introducing part of the FIG. 3A. Referring to FIG. 3B, besides the dimensions of the LGF shown in FIG. 3A, thicknesses of the light exiting surface 102 of the LEDs taken from the lower reflective surface 266 are also included in the table, designated as LS. The thicknesses of the light exiting surfaces detailed in the table, are either 0.4 millimeter (mm) or 0.6 millimeter (mm), of which are coupled with various light incident surface 230 thicknesses.

FIG. 3C is a luminance efficiency graph illustrating exemplary embodiments of relationships between overall lengths of the light introducing part 250 shown in FIG. 3A, of which some combination are included in FIG. 3B.

In FIG. 3C, the horizontal axis is the distance from the light incident surface 230 in millimeters (mm), whereas the vertical axis is the luminance efficiency outputted from upper surface 264 of the light propagating part 260 shown in FIG. 3A. The luminance efficiency illustrated is relative luminance radiated from the light source to the luminance measured at a point in a middle area of the light guide plate, or at a point of the light guide plate in an area of the base film 210 located further than the light controlling portion 220 along the direction of light from the light source.

Further, combinations of the thicknesses of the light exiting surface 102 of the LED designated as LS, and of the light incident surface 230 of the LGF 200 designated as H, are listed with corresponding combination numbers at the right-hand side of the FIG. 3C. A number of the combination are designated within a circle.

Firstly, as depicted as number 1, the combination of 0.4 mm thick LED light exiting surface (LS) and 0.2 mm thick LGF light incident surface (H) is plotted at the lower left-hand corner. The luminance efficiency of number 1 is as low as 60 percent of the emitted luminance of the LED. The number 1 includes a LGF which does not have a light controlling portion 220, since the thicknesses of the light incident surface and the base film is the same.

On the contrary, once there is any light controlling portion 220, whatever the combinations of the thickness of the light exiting surface LS and the light incident surface H are, the luminance is enhanced to be superior to number 1. The lines other than number 1 lie higher than number 1 on the scale of luminance. However, simply placing the light controlling portion 22 is not enough since the LGF is a media for high luminance efficiency, while the base film 210 of LGF is as thin as possible.

As seen in FIG. 3C, there are several lines whose luminance efficiency is over 90 percent. For example, lines 5 and 10, having the same thickness between the light exiting surface LS of the LED and the light incident surface H of the LGF, reach about 95 percent luminance efficiency. Here, a ratio of the thickness of the light incident surface of the LGF, to the thickness of the light exiting surface of the LED is 1.00.

Another example showing over 90 percent luminance efficiency is line 9, the combination of a thickness of a 0.6 mm light exiting surface LS of the LED, and a thickness of a 0.55 mm light incident surface H of the LGF. Here, the ratio of the thicknesses of the light incident surface to the light exiting surface is about 0.92. Yet another example of over 90 percent luminance efficiency is line 4, the combination of a thickness of a 0.4 mm light exiting surface LS and a thickness of a 0.35 mm light incident surface H. Again, a ratio of the thickness of the light incident surface to the thickness of the light exiting surface is about 0.875, which is a little bit lower than the ratio of line 9.

In FIG. 3C, the last example showing over 90 percent luminance efficiency is line 8 having a ratio of the thickness of the light incident surface LS to the thickness of the light exiting surface is about 0.83. In comparison to line 8, line 3 shows a little bit lower luminance efficiency which may not satisfactory to highly efficient LGF and backlight assembly. Since line 3 has 0.75 as the ratio of the light incident surface of the LGF to the light exiting surface of the LED whereas the luminance satisfying line 8 has 0.83, the least satisfying ratio would be 0.80. In addition, the luminance efficiency may be increased even higher with an optimized flat surface length, slope surface length, etc.

In sum, the light incident surface should be at least as thick as 80 percent of the light exiting surface of the LED, to make the LGF and backlight assembly bright enough, while the thickness of the base film remains as thin as possible.

In alternative embodiments, along with enhancing the luminance efficiency of the LGF, uniformity of the LGF may also be enhanced by minute patterns which may be formed simultaneously with the light controlling portion.

Figure 4A:
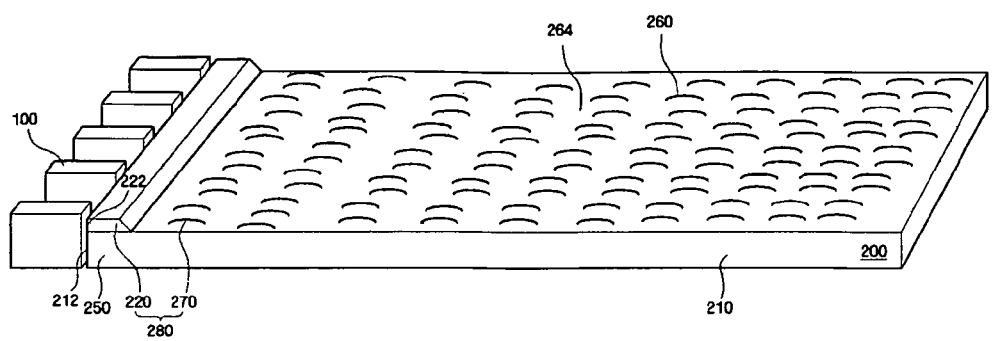
FIG. 4A is a perspective view of another exemplary embodiment of a backlight assembly showing minute patterns formed at a light outputting surface of a light propagation part of a LGF, according to the present invention.

FIG. 4A is a perspective view of another exemplary embodiment of a backlight assembly showing a plurality of minute patterns formed at a light outputting surface of a light propagation part together with a light controlling portion of a LGF. According to FIG. 4A, a light controlling portion 220 of a light introducing part 250 is disposed on the LGF 200, while the edge 222 of the light controlling portion 220 is aligned to be substantially coplanar with a first edge 212 of the base film 210, to receive an optimum amount of light from the LED 100.

In addition to the light controlling portion 220, a plurality of a minute pattern 270 is disposed on the same surface of the base film 210 as the light controlling portion 220. Both the light controlling portion 220 and the minute patterns 270 collectively hereinafter define an optical member 280.

Even though both the light controlling portion 220 and the minute patterns 270 of the optical member 280 are placed on the same surface of the base film 210, the locations are different along the surface. In detail, the light controlling portion 220 is disposed at light introducing part 250 to capture more light from the LED 100, whereas the minute patterns 270 are disposed at the light propagating part 260 to evenly distribute light introduced by the light introducing part 250.

For even distribution of the light at the light propagating part 260, each of the minute patterns 270 may have a height or thickness that is smaller than the thickness light controlling portion 220, measured from the upper surface 264 of the light propagating part 260. In one exemplary in one embodiment of the invention, the height or the thicknesses of the minute patterns 270 are about 20 percent of the height or the thickness of the light controlling portion 220. However, the height or the thickness of the minute pattern 270 is not limited in any ratio to the light controlling portion 220, as long as light is substantially evenly distributed.

As shown in the illustrated embodiment of FIG. 4A, the minute patterns 270 may have substantially a lens shape, but may not limited to a lens shape. The minute patterns 270 may be formed in any of a number of shapes, so long as exited light from the LGF 200 is directed toward various directions. Further, in terms of the density, the minute patterns 270, as shown in FIG. 4A, has a higher density at a distal portion of the LGF, than at the light introducing part 250, since light at the distal portion furthest from the light introducing part 250 should be scattered and internally reflected more to achieve substantial uniform distribution of light. In an alternative embodiment, for higher luminance uniformity, each of the minute patterns' 270 height or thickness may be varied according to the location at the light propagation part 260 relative to the light incident surface 230 of the LGF 200. The height or thickness of the minute pattern 270 is defined by the distance between the surface of the base film 210 upon which the minute pattern 270 is disposed, and the farthest point (e.g., a distal end) of the pattern from the base film 210. For instance, the height or thickness of each of the minute patterns 270 of FIG. 4A may be defined as the distance from the upper surface 264 of the light propagating part 260 of the base film 210, to the highest point of the corresponding minute pattern 270.

In FIG. 4A, the light controlling portion 220 and a plurality of minute patterns 270 of optical member 280 may be disposed on the light outputting surface 264 (e.g., the upper surface) of the base film 210, substantially simultaneously during a manufacturing process, to save manufacturing time and cost. Alternatively, the optical member 280 may be disposed on a light reflective surface 266 (e.g., the lower surface) of the base film 210, as shown in FIG. 4B, or the optical member 280 may be disposed on both of the light outputting surface 264 and the light reflective surface 266 as shown in FIG. 4C.

Figure 4B:
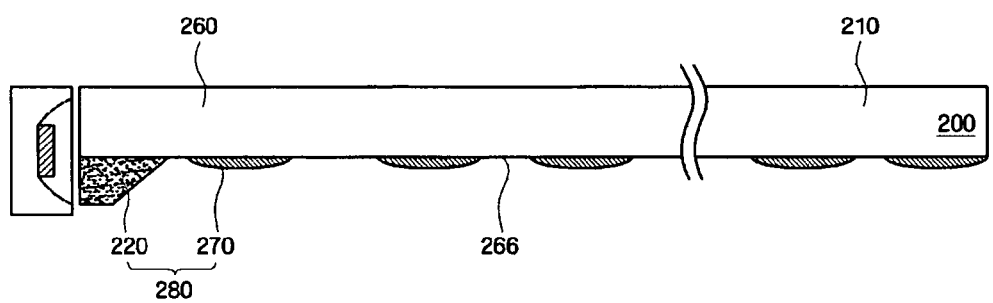
FIG. 4B is a cross-sectional view of another exemplary embodiment of a backlight assembly showing an optical member, both minute patterns and a light controlling portion, is formed on the reflective surface of a LGF according to the present invention.

FIG. 4B is a cross-sectional view of another exemplary embodiment of a backlight assembly showing the optical member 280, collectively formed by both minute patterns 270 and light controlling portion 220, formed on the reflective surface 266. Unlike FIG. 4A, the optical member 280 is disposed on the lower (reflective) surface 266 of the base film 210 of the LGF 200 to reflect light back into the inside portion 262 of the base film 210. In an alternative embodiment, the lower (reflective) surface 266 reflects light to the upper (light outputting surface) 264 together with a reflector (not shown), which may be located below the LGF 200 at a side of the lower surface 266.

Although not depicted, FIG. 4B may be also different from the FIG. 4A in that the size of the minute patterns 270 increases as the minute pattern 270 are disposed further away from the light introducing part 250, to easily distribute light. Similar to FIG. 4A, the minute patterns 270 of FIG. 4B are disposed on the same surface of the base film as the light controlling portion 220.

Figure 4C:
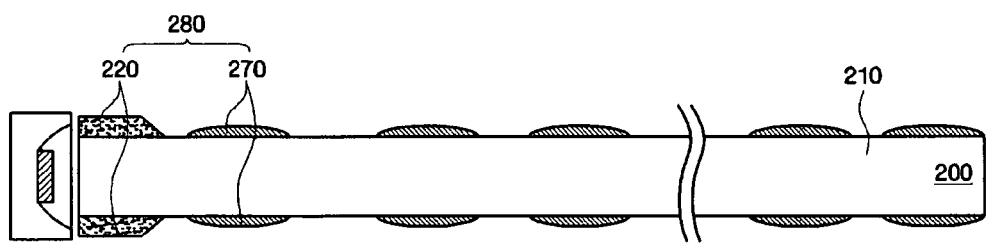
FIG. 4C is a cross-sectional view of another exemplary embodiment of a backlight assembly showing an optical member, both minute patterns and light controlling portion, is formed on both light outputting surface and reflective surface of a LGF, according to the present invention.

Yet another embodiment involving the optical member 280 is depicted in FIG. 4C. FIG. 4C is a cross-sectional view of another exemplary embodiment of a backlight assembly showing the optical member 280, including both the minute patterns 270 and light controlling portion 220, is formed on both of the light outputting surface 264 and the reflective surface 266 of a LGF 200. In FIG. 4C, like FIGS. 4A and 4B, the minute patterns 270 are disposed on the same surface of the base film 210 with the light controlling portion 220. Further, alternative embodiment of minute pattern design discussed above with respect to FIG. 4A and FIG. 4B, may be also applicable to FIG. 4C.

In the mean time, to be functional as a backlight assembly, the base film may include a transparent material, which is relatively easily extruded with a constant thickness and adhered to the optical member 280, etc. In an exemplary embodiment, the base film 210 may include Poly methyl methacrylate ("PMMA"), Polycarbonate ("PC") or Polystyrene ("PS").

In the illustrated embodiments, the optical member 280 is combined with the base film 210, even when the combined base film 210 and optical member 280 of the LGF 200 experience challenging or negative environmental conditions. Even when the LGF 200 is exposed to both high temperature and humidity, the optical member 280 remains attached to the base film 210. In addition, since the optical member 280 has a specific shape and/or dimension according to the location thereof on the base film 210, the material of the optical member 280 is itself adhesive and relatively soft before the optical member 280 is treated in a manufacturing process, such as by ultraviolet ray curing. In one exemplary embodiment, the optical member 280 may include Urethane Acrylate.

FIG. 5 is a table of experiment data showing exemplary embodiments of adhesive strength between various materials of a base film and a material of an optical member. Referring to FIG. 5, the base film is made of one of PMMA, PC and PS while each of the base film is grouped into two, treated with Primer and non-treated. Here, Primer is a media enhancing adhesiveness of the base film and may be made of polypropylene or polyethylene. As already discussed above, the optical member is made of urethane Acrylate and adhered to the base film by UV curing process.

The procedure of the experiment is started by preparing a sample LGF including a plurality of sample optical members disposed on the base film. Next, the LGF was placed in a relatively harsh environment, with negative environmental conditions, which may induce detachment of the sample optical member from the base film. Then, an adhesive tape is attached to the combined optical member/base film structure, for attempting to remove the sample optical members from the base film. Finally, the number of the removed sample optical members is counted.

In detail, the sample LGFs are prepared by placing and UV curing of the sample optical members, made of urethane Acrylate, in a matrix form of 10 by 10 on each of the base film. The sample LGFs are disposed on a harsh environment of 60 degrees centigrade and 90 percent of relative humidity circumstances for 100 hours. Next, an adhesive tape is applied to each of the LGFs which experienced the harsh environment to count the numbers of removed sample optical members of each LGFs. Here, the numbers of the removed optical members are grouped into three; group I for zero removed optical members, group II for 1 to 9 removed optical patches, and group III for over 9 removed optical members.

In FIG. 5, adhesive strength is expressed as strong for group I, medium for group II and weak for group III. As shown, the combination of PC as a base film and Urethane Acrylate as an optical member has strong adhesive strength even without the primer; therefore, urethane Acrylate on the PC base film may be used as a LGF. Also, depending on a specification of an LCD module, the medium adhesive strength combination of PS as a base film and Urethane Acrylate as an optical member may be used. In addition, being found as combinations of strong adhesive strength, all of the base films treated with primer may be used as a LGF.

Figure 6:
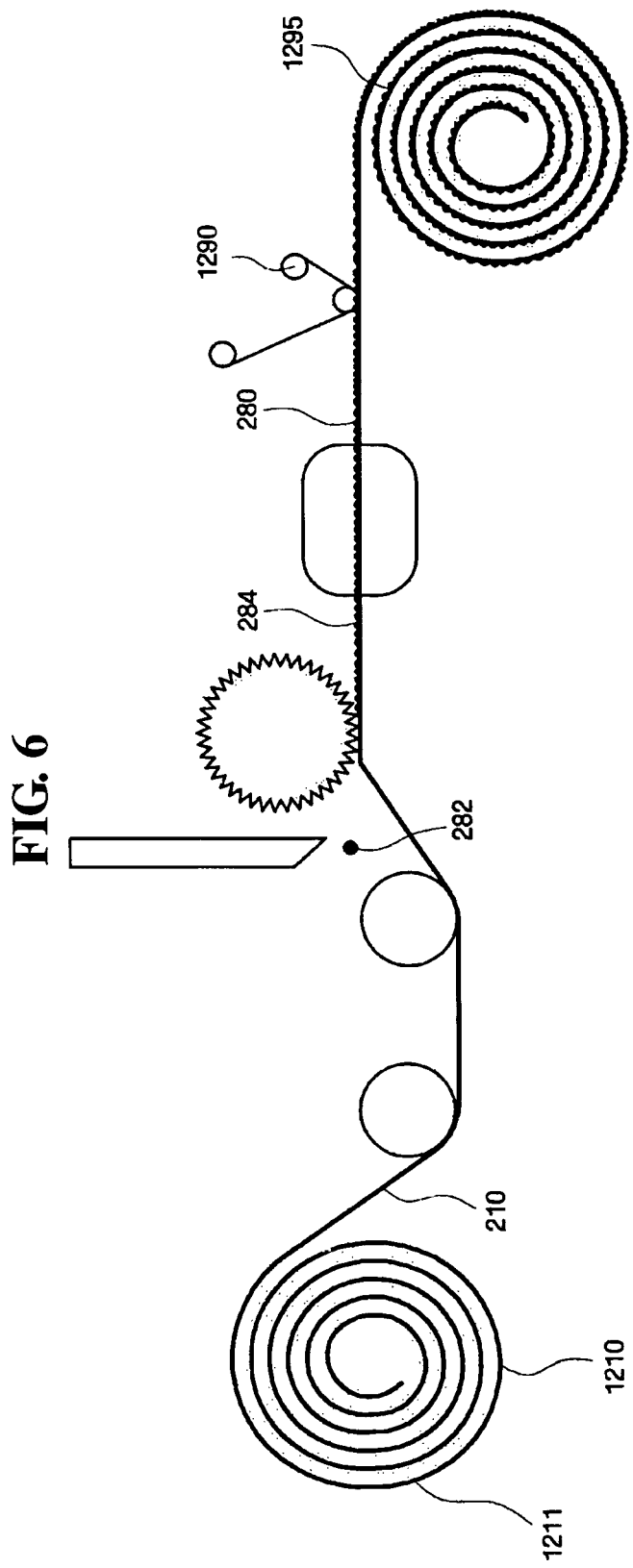
FIG. 6 is a simplified diagram illustrating an exemplary embodiment of a manufacturing process of a LGF, whose optical member is being attached to a base film, according to the present invention.

FIG. 6 is a simplified diagram illustrating an exemplary embodiment of a manufacturing process of a LGF, including an optical member being attached to a base film. Referring to FIG. 6, a mother base film 1210 is rolled on a base film reel 1211. As discussed above, the thickness of the base film 210 may be as low as several hundred micrometers and substantially constant since the base film 210 is manufactured by an extrusion method, not an injection molding method. From the base film reel 1211, the base film 210 is stretched out and receives liquidized optical member material 282, such as Urethane Acrylate.

The disposed optical member material 282 becomes an optical member precursor 284, which includes light controlling portions, and minute patterns of which the thickness is less than the light controlling portion. A set of a plurality of the optical member 284 is repeatedly disposed on the base film 210 since the base film 210 is not yet cut to individual unit LGFs.

The optical member precursor 284 is cured by ultraviolet ("UV") ray to be rigidly attached onto the base film 210, in a solid state. After UV curing, since the optical member 280 has a similar refractive index with the base film 210, both of the base film 210 and the optical member 280 are not distinguishable from each other, and are considered a continuous and indivisible unit. The UV cured LGF has different thicknesses at points with the optical member 280 from points without the optical member 280, while sufficient light can be provided by the LGF included in a backlight assembly.

After UV curing, a protective sheet 1290 is disposed on a surface of the optical member 280 to protect the optical member 280 from being scratched or pressed during handling or subsequent manufacturing processes. The film is rolled again on a LGF reel 1295. The material on the LGF reel 1295 is cut to individual LGFs, whose light exiting surface has substantially a the same roughness throughout the whole of the surface.

FIG. 7 is a cross-sectional view of an exemplary embodiment of a LCD module 2000 which adopts an LGF including an optical member on a base film. Referring to FIG. 7, the LGF 200 is included in a backlight assembly 1000, along with a LED 100 as one example of a light source, reflector 500 and at least one of an optical sheet 600. The LGF 200 includes a light controlling portion 220 to make the light incident surface 230 of the LGF 200 thicker than the base film 210 in a first (vertical) direction, for receiving a relatively large amount of light from the light source (LED) 100. The LGF 200 may further include an LED driving film 160 disposed overlapping an entire of the LED 100 and the light introducing part 250.

Even though the light controlling portion 220 in FIG. 7 is positioned only on an upper surface 264 of the base film 210, the present invention is not limited thereto. Alternatively, the light controlling portion 220 may be positioned on only the lower surface 266, or on both upper and lower surfaces 264 and 266 of the base film 210, so long as the LGF 200 allows the backlight assembly 1000 and the LCD 2000 module relatively thin and compact. Meanwhile, other features of the LCD module like the reflector 500 and the optical sheet 600 are employed to make the whole backlight assembly 1000 optically as bright and uniform as possible.

A gap taken in the first (vertical) direction may be defined by an uppermost point of the light controlling portion 220 and an upper surface of the light propagating part 260, by a different in height of the two features. In an exemplary embodiment either of the reflector 500 or the optical sheet 600 may be positioned in the gap formed between the light controlling portion 220 and the base film 210, to reduce an overall thickness of the backlight assembly 1000. As seen in FIG. 7, the gap may be increased by a LED driving film 160 on which the LED 100 is disposed. The LED driving film 160 may be stretched out to cover a whole of the light introducing part 250 of the LGF 200, and redirect light to the LGF 200 by having a reflective coating (not shown) disposed on a surface facing the LGF 200.

The backlight assembly 1000 illuminates a TFT panel 700 on which images are displayed. Both the backlight assembly 1000 and the TFT panel 700 are accommodated by a bottom container 800 and top frame 900, respectively.

In the illustrated embodiments, by using thin base film 210 and the LGD 200 of the present invention, an overall thickness of a backlight assembly 1000 and an LCD module 2000 may be reduced, such that the backlight assembly 1000 and the LCD module 2000 may be compact and light.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:
1. A light guiding film comprising:
  a base film including a first edge and a first surface, the base film extended from the first edge with a substantially constant thickness in a first direction to define the first surface, and
  a light controlling portion including a light controlling portion edge and disposed on the first surface of the base film,
  wherein
  the base film is flexible and the light controlling portion edge is disposed coplanar with the first edge of the base film, and
  a thickness of the base film is between about 100 micrometers and about 400 micrometers.
2. The light guiding film of claim 1, wherein a light incident surface of the light guiding film is defined by the first edge of the base film and the light controlling portion edge of the light controlling portion being disposed coplanarly.

3. The light guiding film of claim 2, wherein the base film is formed using an extrusion method.

4. The light guiding film of claim 3, wherein the base film includes a material selected from the group consisting of Poly methyl methacrylate (PMMA), Polycarbonate (PC) and Polystyrene (PS).

5. The light guiding film of claim 4, wherein the base film is treated with primer.

6. The light guiding film of claim 2, wherein the light controlling portion is disposed on the first surface by ultraviolet ray curing.

7. The light guiding film of claim 6, wherein the light controlling portion includes urethane acrylate.

8. The light guiding film of claim 7, wherein the base film is polycarbonate.

9. The light guiding film of claim 7, wherein the base film is polystyrene.

10. The light guiding film of claim 1, wherein refractive indexes of the base film and the light controlling portion are substantially the same.

11. The light guiding film of claim 10, wherein the refractive indexes of the base film and the light controlling portion are greater than about 1.4.

12. The light guiding film of claim 1, wherein the light controlling portion further including a first portion substantially inclined from the light controlling portion edge to the first surface of the base film.

13. The light guiding film of claim 12, wherein the light controlling portion further includes a second portion disposed between the light controlling portion edge and the first portion, the first portion inclining from the second portion to the first surface of the base film.

14. The light guiding film of claim 1, further comprising a plurality of a minute pattern disposed on the first surface of the base film and separated from the light controlling portion.

15. The light guiding film of claim 14, wherein a thickness of each of the minute patterns is smaller than a thickness of the light controlling portion.

16. The light guiding film of claim 15, wherein the thickness of the minute pattern is less than 20 percent of the thickness of the light controlling portion.

17. A liquid crystal display module, comprising,
a backlight assembly emitting light,
a TFT panel disposed to receive the light emitted from the backlight assembly,
a bottom container accommodating the backlight assembly and the TFT panel, and
a top frame combined with the bottom container,
wherein the backlight assembly comprises:
  a light source including a light exiting surface, and
  a flexible light guiding film including:
    a light incident surface facing the light exiting surface of the light source,
    a base film, and
    a light controlling portion disposed on the base film and adjacent to an edge of the base film,
    wherein an edge of the light controlling portion and the edge of the base film are coplanar and define the light incident surface of the light guiding film, and
    wherein a thickness of the light incident surface of the light guiding film is more than 80 percent of a thickness of the light exiting surface of the light source, the thicknesses taken in a direction substantially perpendicular to the base film.

18. The liquid crystal display module of claim 17, wherein the light incident surface is a single and continuous surface, and refractive indexes of the light controlling portion and the base film are substantially the same.

19. The liquid crystal display module of claim 17, wherein the base film is manufactured by extrusion method.

20. The liquid crystal display module of claim 19, wherein the base film includes a material selected from the group of Poly methyl methacrylate (PMMA), Polycarbonate (PC) and Polystyrene (PS).

21. The liquid crystal display module of claim 18, wherein the light controlling portion is disposed on the base film by ultraviolet ray curing.

22. The liquid crystal display module of claim 21, wherein the light controlling portion includes urethane acrylate.

* * * * *